United States Patent [19]

Senkpiel et al.

[11] 4,128,852

[45] Dec. 5, 1978

[54] TAPE TRANSPORT MECHANISM FOR RECORDING AND PLAYING BACK VIDEO SIGNALS

[75] Inventors: Werner Senkpiel, Laudenbach; Klaus Schoettle, Heidelberg; Heinrich Wittkamp, Mannheim; Karl Uhl, Frankenthal, all of Fed. Rep. of Germany

[73] Assignee: BASF Aktiengesellschaft, Ludwigshafen, Fed. Rep. of Germany

[21] Appl. No.: 775,318

[22] Filed: Mar. 7, 1977

[30] Foreign Application Priority Data

Mar. 19, 1976 [DE] Fed. Rep. of Germany ....... 2611666

[51] Int. Cl.² .................. G11B 15/26; G11B 15/60; G11B 5/78; B65H 17/32
[52] U.S. Cl. ........................ 360/90; 360/130; 360/134; 226/97; 242/192
[58] Field of Search .................... 360/90, 130, 134; 226/97, 196; 242/192

[56] References Cited

U.S. PATENT DOCUMENTS

| 3,585,313 | 6/1971 | Newell | 360/90 |
| 3,979,037 | 9/1976 | Burdorf | 226/196 |

FOREIGN PATENT DOCUMENTS 2436008 3/1975 Fed. Rep. of Germany .......... 242/192

*Primary Examiner*—Robert S. Tupper
*Attorney, Agent, or Firm*—Keil, Thompson & Shurtleff

[57] ABSTRACT

The invention is directed to a tape transport mechanism for recording and playing back video signals comprising a contact winding mechanism with tape-guiding means at the capstan and a magnetic tape in which the substrate is a polyethylene terephthalate film. The coated side of the tape, during transport, is in contact with the guide surface of the guide means, and no part of the transport mechanism at which slip could occur during the tape transport is allowed to be in contact with the tape substrate. The tape is wound with its substrate on the inside and its coated side is preferably abrasive with respect to the guide surface, which latter may advantageously consist either of steel or a ceramic material. The bonding agent of the magnetic dispersion — preferably a chromium dioxide dispersion — may be prepared from a polyurethane/polyvinyl chloride mixture which imparts the desired hardness to the tape. The arrangement can be advantageously employed with any kind of record/playback apparatus for video signals which includes a stationary head and develops high tape advance speeds.

11 Claims, 1 Drawing Figure

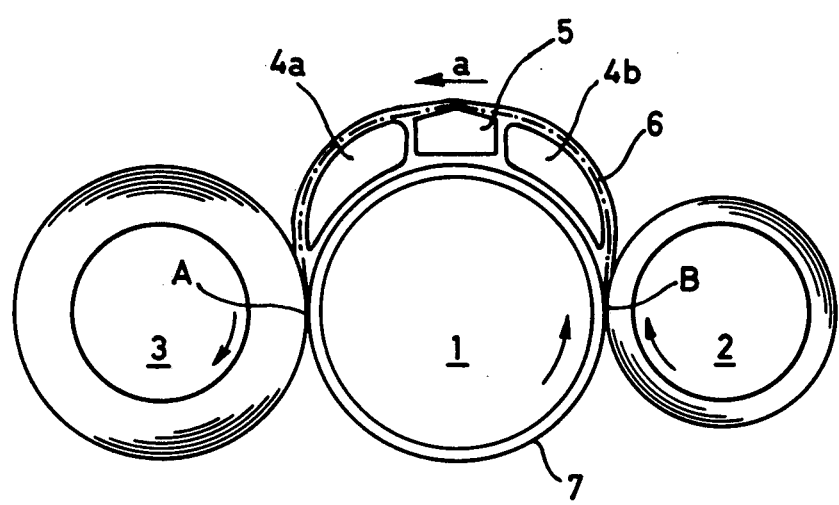

TAPE TRANSPORT MECHANISM FOR RECORDING AND PLAYING BACK VIDEO SIGNALS

This invention concerns an arrangement comprising a transport mechanism for recording and playing back video signals on magnetic tape in which the substrate is a polyethylene terephthalate film, the transport mechanism operating on the contact-winding principle and consisting essentially of a supply and a take-up reel of magnetic tape, at least one rotating capstan and means for the simultaneous driving of both tape reels by contact pressure of each of the two reels on the capstan and, furthermore, means for generating tape tension in the tape section between the contact pressure points of the reels on the capstan and in which the magnetic tape is guided, by means of at least one arcuate tape guide element partly surrounding the capstan, relative to at least one magnetic recording and/or reproducing head and in contact therewith.

In order to record and to reproduce signals, and video signals in particular, contact between the magnetic head and the magnetic tape is necessary.

During the recording/playback operation, the coated side of the magnetic tape is in direct contact with the mirror-like surface of the magnetic head(s) and envelops it with an angle of grip. Especially at high tape transport speeds, the advantage of satisfactory tape/head contact is offset by the disadvantage of heavy wear with regard to both head and tape. In order to keep the wear of the magnetic coating as low as possible, it is conventional to arrange the necessary tape guide elements on the substrate side of the magnetic tape wherever possible.

A closed-loop transport mechanism is known in the case of which a scimitar-shaped tape guide is arranged around part of the circular capstan against part of which the tape is urged at two points by means of pressure rollers, the magnetic head(s) being integrated with the surface of the said stationary tape guide in such a way that the coated side of the magnetic tape is in continuous contact not only with the magnetic head(s) for the purpose of recording/reproducing signals, but also with the guide surface. Here, the tape transport takes place in such a way that, even at the highest transport speeds for video recording or playback the tape makes contact with the guide surface and slides thereon. However, the substrate of the tape faces the pressure roller, so that slip can occur between this pressure roller and the tape, whereby the film forming the substrate is subjected to wear and damage.

Another transport mechanism operating on the contact-winding principle has been disclosed in the utility patent DBGM 7.425.512, which is suitable for maximum tape transport speeds. Here, too, both the tape supply and the tape take-up reel are in contact with a capstan which drives these reels. Between the points of contact of the capstan and tape reels, where there is little, if any, a scimitar-shaped guide element is arranged near the circumference of the capstan, and the tape is guided by means of an air cushion generated between the guide surface and the substrate of the tape. By means of such an air cushion or film in conjunction with a stationary guide or deflection element or by means of rotatably supported guide rollers, it becomes possible to reduce friction between tape and guide elements to such a degree that very high tape transport speeds become possible.

In this known transport mechanism in which an air cushion or film is provided between tape substrate and guide surface, both the tape and the guide surface should be virtually free of wear. In actual fact, however, disturbances do occur during the recording and/or reproduction of video signals, notwithstanding the air cushion, because contact between the substrate of the magnetic tape and the guide surface cannot always be avoided.

Another known measure is to provide the non-coated side of the tape substrate with a backing suitable for protecting the substrate and for improving the winding operation by facilitating the escape of air between the turns of the wound reel. However, such additional backing is uneconomical and is impossible if the thickness of the video tape is confined to such dimensions that any backing would have to be restricted to less than 1 $\mu$m.

The present invention, therefore, has as an object transport mechanisms by which very thin magnetic tape for recording and/or reproducing signals, and in particular video signals, is transported at the very high speeds, in which wear is largely avoided and which is largely free from disturbances.

Another object of the invention is to provide an inexpensive tape transport mechanism for video recording/playback for home use.

According to the invention the arrangement for a transport mechanism for the recording and/or reproduction of video signals on magnetic tape in which the substrate is a polyethylene terephthalate film, the transport mechanism operating on the contact-winding principle and consisting essentially of a supply reel and a take-up reel of magnetic tape and of at least one rotating capstan and means for the simultaneous driving of both tape reels by contact pressure of each of the tape reels upon the capstan, and of means for generating tape tension in the tape section between the points of tape reel pressure on the capstan and in which the magnetic tape is guided relative to at least one magnetic recording and/or reproducing head and in contact therewith by means of at least one arcuate tape guide element surrounding part of the capstan, is characterized in that the substrate side of the magnetic tape is never in contact with any part of the transport mechanism at which slip can occur during tape transport.

In this way it becomes possible to exclude, or at least substantially to reduce, disturbances which are known to occur during tape transport and are caused by tape slip, tape edge or guide edge effects, and particularly tape adhesion effects on starting the tape transport.

An essential advantage of the invention is that contact between the substrate of the tape consisting of a polyethylene terephthalate film which, as has been found, is a rather abrasive material, and the tape guide means is largely avoided. In this way, the hazard of abrasion, which is a nuisance in sensitive recording processes such as, for example, in the case of high-frequency video or data recording, as will be seen later, is considerably reduced if not entirely eliminated from the outset.

Some abraded particles are deposited between the turns of the tape reel, and particles will then adhere to the coated side of the tape. In such places, the tape will be lifted off the recording or playback head, and this causes recording or playback faults. Other particles will become deposited on the guide surface of guide elements and form points of disturbance in those places which, in the long run, lead to the formation of dirt agglomerations and grow into mounds the height of which can be up to 200 μm above the level of the guide surface. The tape moving past such a raised portion will continuously wipe them whereby further abrasion debris (from the polayester film) are produced. This will also cause scratches in the tape which will become rough. After a comparatively short period of use the accumulation of dirt and the occurrence of faults will increase sufficiently for the tape and the apparatus to become useless. Only by employing known cleaning methods and devices is it possible to restore the apparatus to its operating condition. This greatly increases the operating costs of the equipment. Frequently, a soiled tape which may be subjected to further damage by aggressive cleaning methods becomes entirely useless. Equipment of this type is far too costly for domestic use.

The present invention avoids the disadvantages of these known tape transport mechanisms and the life of the equipment and of tapes is prolonged, while maintenance requirements are eliminated.

In an advantageous embodiment of the transport mechanism of the invention, the magnetic tape is wound with the substrate on the inside and its coated side facing the surface of the tape guide element.

Further according to the invention, there may be provided during the tape transport a separately generated air cushion or film of pre-determined dimensions between the coated side and the surface of the guide element while, on the one hand, the coated face of the tape is continuously in contact with the magnetic head(s) whereas, on the other hand, an air cushion or film of substantially constant thickness is continuously formed between the guide surface and the coated face of the magnetic tape.

By employing such an air cushion the functioning of the tape transport mechanism is improved still further, especially as regards static charges — if the substrate film runs adjacent the tape guide surface and, otherwise, in view of the tendency of thin, very smooth tape to block (adhesion effect) — if, when the transport mechanism is restarted after stopping the coated face of the tape according to the invention, runs adjacent the guide surface.

A further useful measure consists in providing the tape destined for use with the apparatus of the invention with a coated surface by means of which, during tape transport, at least a slight polishing action on the guide surface is achieved.

In this way the guide surface is automatically kept free of deposits — at least to a large extent — and damage to the coated side of the tape as well as contact failure between the tape and the magnetic head(s) is avoided. Magnetic tape suitable for use with the transport mechanism of the invention may contain a magnetic layer consisting of a chromium dioxide dispersion which contains a bonding agent consisting of a mixture of 7.5 parts of polyurethane and 2.5 parts of polyvinyl chloride, this mixture ratio extending to 1.5 parts of polyurethane and to 8.5 parts of polyvinyl chloride, but preferably composed of 4 parts of polyurethane and 6 parts of polyvinyl chloride.

By adapting the hardness of the magnetic coating to the material of the tape guide surface, the blocking tendency of thin video tape at the guide surface can be eliminated. Similarly, the invention provides for hard particles to be introduced in the magnetic dispersion, thus increasing the abrasiveness of the tape.

The drawing illustrates in diagrammatic representation and in plan a transport mechanism of the type which operates according to the contact winding principle according to the invention in which the tape is wound with its substrate-surface side facing inward and its coated side facing outward and a magnetic head is provided in the tape guide arrangement. In the following description of the illustrated embodiment, the reference numeral 1 indicates the capstan which drives the rotatably supported supply and take up reels 2 and 3 simultaneously by contact pressure. In the present case, the numeral 2 indicates the supply reel and the numeral 3 the take-up reel, in accordance with the running direction of the tape as indicated by arrow a). Those arrows which do not bear reference numerals indicate the sense of rotation of the tape reels and the capstan when the running direction is as indicated by a).

The capstan 1 is partially surrounded by a tape guiding element which consists of the parts 4a and 4b, and in the space intervening between the parts 4a and 4b there is provided the magnetic head 5 whose gap(s) is (are) situated within the plane in which the tape is guided. The tape 6 has a magnetic coating on one side which is indicated by dash-dot lines, and a substrate surface indicated by a solid line. As can be gathered from the drawing, the tape is transported with its coated side adjacent the guide surfaces of the guide elements 4a and 4b and also faces the magnetic recording and/or playback head 5 with its coated side. In accordance with the proposed type of transport mechanism, the tape 6 is wound into supply and take up reels with its coated layer facing outward — and this applies to the supply reel as well as to the take-up reel, so that the substrate surface enjoys maximum protection. In accordance with the principle used in this transport mechanism, slip does not occur at points A and B where the capstan is in contact with the reels 3 and 2 respectively, especially because the capstan 1 is provided with a rubber lining or some other suitable resilient cover 7 at its circumference.

Below, the advantages of an arrangement such as proposed by the present invention will be explained with reference to an example.

The magnetic tape used here may be a tape suitable for the recording of video signals comprising a magnetic chromium dioxide layer on a polyethylene terephthalate film substrate such as Mylar ®.

The magnetic layer of this chromium dioxide tape is formed from a dispersion consisting of magnetic chromium dioxide particles and a bonding agent. The bonding agent consists, for example, of polyurethane and PVC (polyvinyl chloride) mixed at a ratio of 7.5/2.5 to 1.5/8.5 polyurethane/PVC, and preferably a ratio of 4:6. The coated side of this magnetic tape has a roughness $R_t$ of between 0.05 μm and 0.15 μm, and preferably $R_t = 0.1$ μm, whereas its substrate has a surface roughness $R_t$ of between 0.1 and 0.25 μm. The substrate, i.e. the Mylar film of the magnetic chromium dioxide video tape used in this case, has a thickness of 6 μm and is stretched in the longitudinal direction during manufacture. The above-described magnetic chromium dioxide tape was moved at a speed of 3 m/s, with a tape tension of 50 p (pond) past a tape guide consisting of V2A steel and comprising two raised portions separated in the longitudinal direction by a groove of concave curvature (depth $h = 5$ μm). A tape guide of this type is disclosed in U.S. Pat. No. 3,979,037.

The same tape was transported at the same speed on an air cushion, produced by an air supply, or a film, of a height $h = 10-25$ μm. In either case, the upper layer of the tape did not show any scratches after 100 hours of continuous operation. To explain this test result it must be assumed that the coated side of the tape acts in the manner of a polishing belt whose abrasiveness grows with its PVC content, i.e. its polishing action increases with the reduction of the above-quoted ratio. At most, the tape is subjected to a slight abrasive action — without the possibility of scratches occurring. On the other hand, if the tape is transported with its substrate surface in contact with the same tape guide, then the substrate surface is damaged in that particles are torn out of the surface of the substrate. These particles are deposited in microscopic recesses of the tape guide and form agglomerations and raised portions which, in turn, produce scratches on the surface of the substrate, and this, in turn, enhances abrasion. Such abrasive action can be even after short tape runs, if the tape transport speed is 3 m/s, as mentioned above. Obviously, it is also possible to employ still higher speeds. The lower limit of the roughness of the guide surface that is possible in practice is determined by the adhesive effects which will be encountered (blocking of the tape, for instance, on restarting the transport mechanism after a previous stop).

The guide surface of the tape guide may consist of any suitable material of adequate roughness, such as ceramic material, for example.

It is of course also possible to achieve the polishing action of the tape by the addition of grinding or abrasive particles to the magnetic particles employed, for example iron oxide or doped iron oxide or pigmented iron, or by using a suitably "hard" bonding agent in conjunction with the employment of such grinding particles. Grinding or abrasive particles may be any particles having a Mohs' hardness greater than 6 (which is Mohs' hardness of iron oxide). Particles of orthoclase, quartz, rock crystal, topaz, corundum, melamite, zirconium oxide, alumina, silicon carbide, boron carbide, titanium carbide, tungsten carbide, chromium oxide or molybdenum may be used.

We claim:

1. In an arrangement for the recording and/or reproduction of video signals by means of a magnetic tape having a substrate of a polyethylene terephthalate film which is coated on one side thereof, said arrangement including a transport mechanism of the type which operates according to the contact-winding principle and which consists essentially of a supply and take-up reel of said magnetic tape and at least one rotating capstan wherein the two tape reels are simultaneously driven by virtue of contacting said capstan under pressure, said transport mechanism further including means for generating tape tension in the span of said magnetic tape between the points of contact of said tape reels with said capstan and said tensioned span of magnetic tape being guided relative to and maintained in contact with at least one magnetic recording and/or playback head by means of a tape guiding element having a guide surface which partially surrounds said capstan, the improvement comprising:

said magnetic tape being positioned with its coated side facing the guide surface of said tape guiding element and having particles within its coating with a Mohs' hardness of greater than 6, thereby imparting at least a slight polishing effect on said guide surface during the tape transport operation, said magnetic tape being exclusively guided by said tape guiding element and coming into contact only with the magnetic recording and/or playback head and the capstan at the points of contact with the supply and take-up reels within said transport mechanism whereby the substrate surface side of said magnetic tape opposite said coated side will not contact any part of the transport mechanism which could effect the occurrence of slip between such part and the substrate surface during the tape transport operation.

2. The arrangement according to claim 1 wherein said magnetic tape is wound into said supply and take-up reels with its substrate surface side facing inward and its coated side facing outward.

3. The arrangement according to claim 1 wherein an air cushion of predetermined dimension of substantially constant thickness of continuously generated between the coated side of said magnetic tape and said guide surface during the tape transport operation, said coated side of the magnetic tape being placed by said air cushion in continuous contact with said magnetic recording and/or playback head.

4. The arrangement according to claim 3 wherein the cross-section of said guide surface has a concave curvature formed so that the magnetic tape is guided across said guide surface in a substantially planar position.

5. The arrangement according to claim 1 wherein the coated side of said magnetic tape comprises a chromium dioxide dispersion containing a bonding agent consisting of a mixture of 7.5 parts of polyurethane and 2.5 parts of polyvinyl chloride, the ratio of which extends to 1.5 parts polyurethane and 8.5 parts polyvinyl chloride, and preferably to 4 parts polyurethane and 6 parts polyvinyl chloride.

6. The arrangement according to claim 5 wherein the bonding agent consists of 4 parts polyurethane and 6 parts polyvinyl chloride.

7. The arrangement according to claim 1 wherein the guide surface of said tape guide element is made of steel.

8. The arrangement according to claim 7 wherein the coated side of said magnetic tape is formed by a magnetic dispersion containing a bonding agent which consists of 7.5 parts polyurethane to 2.5 parts polyvinyl chloride, the mixture ratio therebetween extending to 1.5 parts polyurethane and to 8.5 parts polyvinyl chloride.

9. The arrangement according to claim 8 wherein the bonding agent of the magnetic dispersion consists of 4 parts polyurethane to 6 parts polyvinyl chloride.

10. The arrangement according to claim 1 wherein said particles within the coated side of said magnetic tape are magnetic chromium dioxide particles.

11. The arrangement according to claim 1 wherein the guide surface of said tape guiding element is made of a ceramic material.

* * * * *